March 31, 1931. J. H. BATES 1,798,515
MACHINE FOR MAKING WAFER BISCUITS AND THE LIKE
Filed Nov. 13, 1929 2 Sheets-Sheet 1
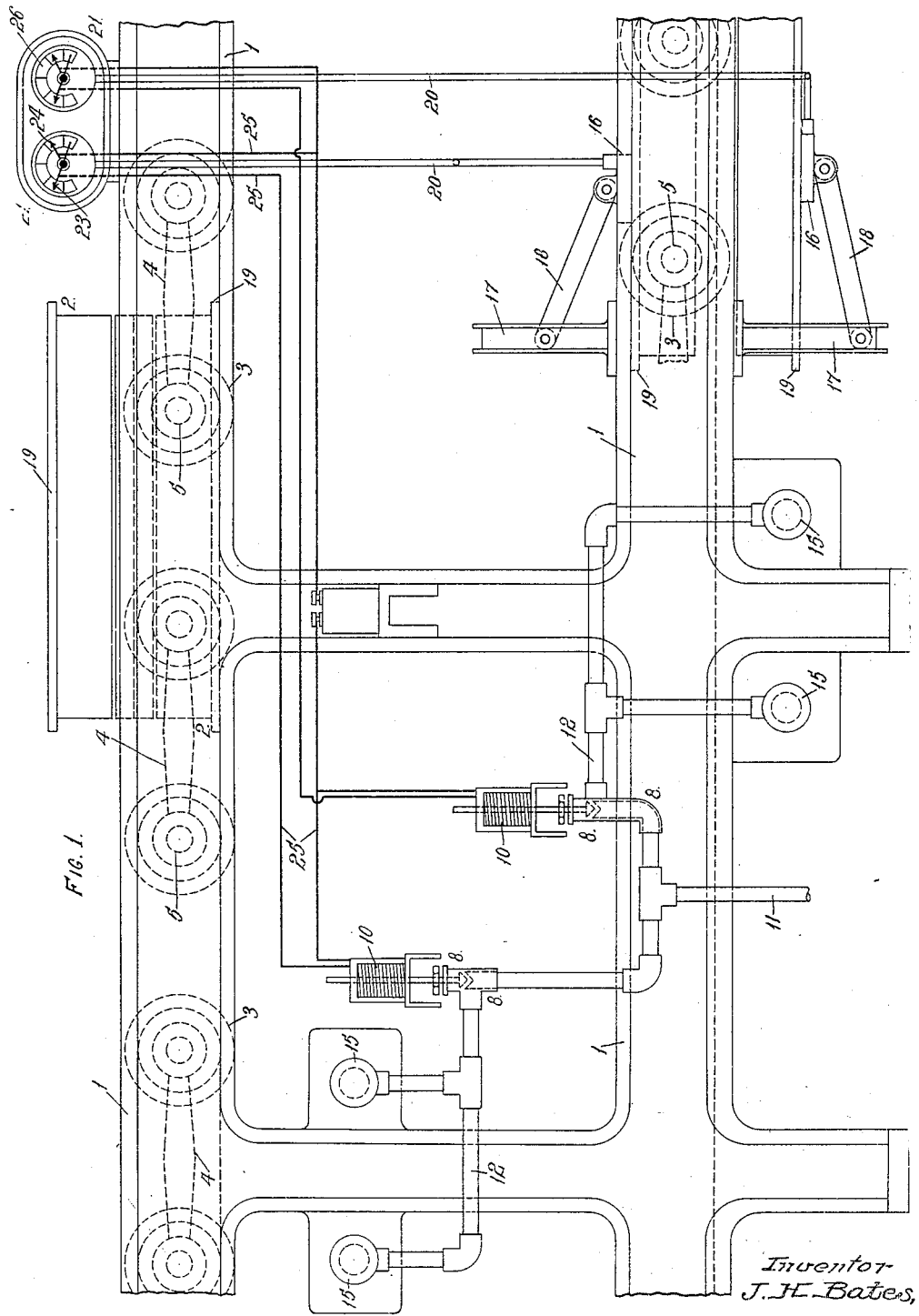

March 31, 1931.   J. H. BATES   1,798,515
MACHINE FOR MAKING WAFER BISCUITS AND THE LIKE
Filed Nov. 13, 1929   2 Sheets-Sheet 2
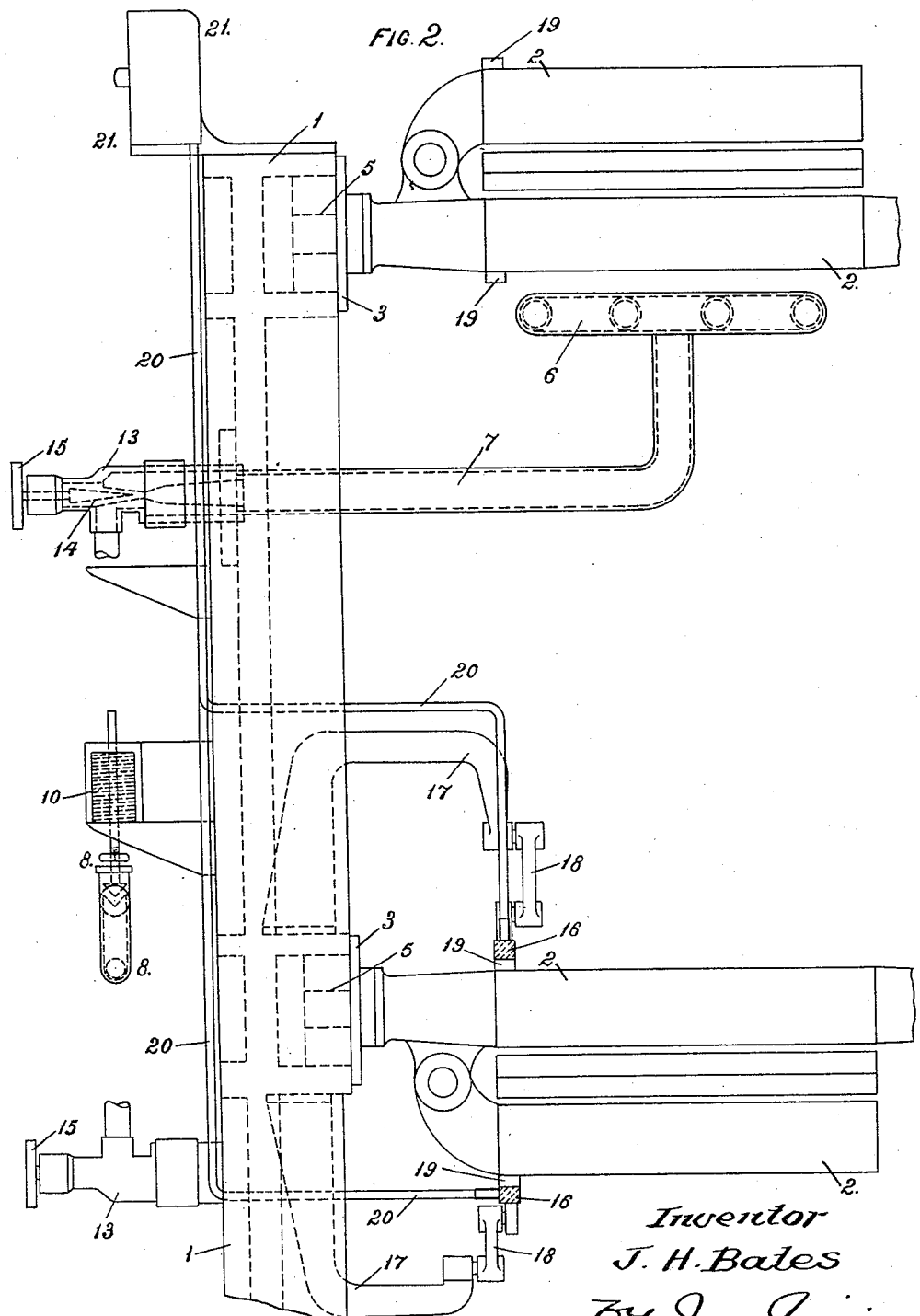

Patented Mar. 31, 1931

1,798,515

UNITED STATES PATENT OFFICE

JOSEPH HENRY BATES, OF LIVERPOOL, ENGLAND

MACHINE FOR MAKING WAFER BISCUITS AND THE LIKE

Application filed November 13, 1929, Serial No. 406,916, and in Great Britain November 21, 1928.

This invention has reference to machinery for making wafer biscuits and similar articles from batter; and it relates more particularly to that type in which a plurality of sets of "plates" are employed, which pass through a gas or other heated oven or chamber, with the batter enclosed within them, and after cooking the plates come out of the oven, and are opened and the cooked articles removed, and then the plates are re-charged with batter and the operation is repeated. In some cases the plates are connected together in series in an endless manner, and are mounted on wheels or runners, which run on upper, lower, and circular end tracks.

The present invention has reference more particularly to the heating of this type of apparatus or machine, and the plates as they move through or along it; and it has more particularly for its object to provide improvements in connection with such machines by which the temperature of the heating oven and plates is rendered uniform, and kept constant, and to do this automatically.

In machines of the character concerned, it is common practice to employ gaseous fuel as the heating medium, and commonly burners are used below the upper and lower "runs" of the plates, the burners being of the Bunsen or "atmospheric" type; and according to this invention the amount of gas or heating fluid supplied to the burners is regulated or varied automatically by means of a thermostat, which operates a regulating device connected with the supply of the heating medium.

According to one method and arrangement of parts, the heat of the plates themselves is used to effect the operation of the thermostat, so that the quantity of gas or heating medium supplied to the burners is such that it will heat and maintain a practically constant temperature in the plates, and the heat of the plates is transmitted, say to mercury or liquid which expands and contracts according to the varying temperature of the part with which it is in contact or by which it is heated; and in some cases this expansion and contraction is transmitted to a pressure or gravity or other known suitable kind of gauge or indicator, which when the plates are of the right temperature, will indicate same by a movable indicating means on the indicator; and the indicator may also have a master pointer or indicator to show the degree of temperature which it is desired the plate should have.

Further, this movable gauge or indicator is adapted to operate in connection with electric circuits in which are electromagnetic devices such as solenoids, which actuate a regulating device in the conduits through which heating gas or medium is conducted to the burners; and these parts are so arranged that when the temperature falls below that required, the circuit will be closed, and the gas or heating medium controlling supply device such as a valve or needle, will be moved, and the variation of supply effected.

With this method of controlling the supply of gas or heating medium, a practically constant temperature within required limits can be maintained in the plates.

The heat of the plates is preferably transmitted to the thermostat indirectly; as for instance there may be used on or in connection with the plates, strips or bars standing outside the plates, to which the heat thereof is conducted; and these bars or contact strips, operate on or in connection with stationary slippers which form the base or "bulb" of the thermostat which may be of the mercury or other suitable type, the slippers being heated by contact with the strips or bars as the bars slide over them.

It will only be necessary to use one pair of these slipper devices, and thermostats in connection with the machine; and they may be suitably disposed at the lower part of the plates, and in the oven or cooking portion of the machine.

In one arrangement, where different burners are used for heating the upper and lower runs of the plates, the fuel supply regulating valves or devices may be operated directly by a solenoid supported above them, and working in connection with a suitable seat portion of the supply pipes, which lead the fuel from the fuel mains to the different burners above and below.

The inlet or mixing tube of the atmosphere burners may have its inlet end on one side of the machine at which side also are situated the electrically operated or controlled heating medium supply valves or devices.

The rendering uniform of the temperature of the plates continuously, is important, in that the behaviour of the batter used in this kind of cooking apparatus is uniform, and therefore the degree of cooking of the biscuits or articles is constant, giving a constant colour and character of biscuits or article, which is much desired.

Furthermore, having the right temperature for cooking, and the constant result or effect, the operators of the machine are enabled to work much better generally, and without trouble, and causes for stopping or cleaning the plates, and the like; and it promotes also the automaticity of the machine, and it enables the automatic supply and removal of the biscuits or articles to be accomplished.

The invention is illustrated in the annexed drawings, in which Figure 1 is a side elevation, and Figure 2 is an end view.

The machine as shown in the drawings, to which the invention is applied, is of the kind above referred to, of which 1 is the general frame of the machine, and 2 are the cooking "plates" of the opening and closing kind, supported on wheels 3 which run on suitable rails inside the frames 1, and the adjacent ends of the successive plates are connected together by coupling links 4 which are secured to the axles 5 of the wheels.

The burners proper are marked 6, and are placed in the usual positions in relation to the plates, both above and below, so that the plates are heated on both sides.

7 are the mixing tubes for the air and gaseous fuel, and 8 are the gas supply valves, which are controlled electrically by the solenoid or electromagnetic device 10; the gas being supplied by a pipe 11. The gas from the valve 8 is supplied by a pipe 12 to the air and gas mixing device 13 of the burners, which is of any known suitable kind, having a tapered regulating nozzle device 14 operated by a knob 15.

As will be seen in Figure 1, one set of burners is supplied to the upper part of the machine, and the other to the lower side.

With regard to the thermostats, these are marked 16, and consist of a rectangular or flat sided vessel or bulb filled with mercury or other suitable fluid, and connected to fixed brackets 17 by hinged links 18, the lower link 18 being pulled upwards by a spring so as to hold up the thermostat fluid container or bulb 16; and in operation these mercury or liquid containers or bulbs act as slippers in connection with bars 19 fixed on one side of the upper and lower plates of each set, the ends of the bars projecting or overlapping the ends of the plates; so that when the plates are in the horizontal position, and travelling along, there is only a small gap between the adjacent ends of the bars; and therefore in action, there is practically a continuity of contact between the thermostat vessels 16, and the plates and bars, which will have the same temperature.

As shown, a thermostatic device is used in connection with both the upper and lower plates of a set; and the bulbs or vessels 16 are connected by tubes 20 with the indicating and electrical circuit closing and opening devices 21.

This device 21 comprises an indicator or finger 23 which is adapted to be operated— i. e. moved over a dial 26—by the rise and fall of the liquid in the tubes 20, as the temperature in the plates and their bars rises and falls, the connection between the liquid and the finger being by a weight acted on by the thermostat fluid, and a cord or the like connected with the axle of the finger indicator, in the well-known way of indicators of such a kind, worked by the rise and fall of thermometric liquid. Thus, as the temperature rises and falls, and the liquid rises and falls in the tube 20, the pointers or indicators 23 are revolved about their axes.

In the indicator apparatus, another pointer or indicator 24 is used, which is mounted on a separate axis, about which it is adapted to be adjusted and set or fixed by hand; and to each of these pointers is connected a wire 25, which extends between them and the electromagnetic devices 10, and the two pointers serve as part of the electric circuit, and a contactor means within it.

In action, when the temperature rises so that a part of or a device on the moving pointer or finger 23, comes in contact with the pointer 24 or a contact part connected therewith, the circuit of the electromagnets 10 will be closed; and the magnets being so arranged that when energized the valves 8 will be moved so as to close or nearly close the seat in the pipe between the pipe 11 and the air and gas mixing device 13; and thereby the supply is diminished. The valves 8 are always kept slightly open, so that the burners 6 are permanently kept alight.

When the temperature of the plates 2 and bars 19 falls, the liquid in the cases or bulbs 16 and tubes 20 contracts, and the pointer or finger 23 is moved out of contact with the pointer or indicator 24, and the circuit of the electromagnets 10 is opened; and so again the valves 8 are raised, and the supply of gas increased.

Thus, automatically, the temperature of the plates is maintained sufficiently constant between a desirable maximum and minimum, and thereby the degree of cooking of the biscuits or articles is completely controlled. This degree is determined and controlled by the position to which the adjustable finger 24 is set on the divided temperature dial 26.

What is claimed is:—

1. Machinery for making wafer biscuits and similar articles from batter, comprising travelling "plates" heated by gaseous fuel, a thermostatic device adapted to be heated by the hot travelling plates, gaseous fuel heating burners, and a fuel supply regulating valve connected with same operated by the thermostatic device, whereby the temperature of the plates is maintained substantially uniform or to the degree required.

2. Machinery for making wafer biscuits and similar articles from batter, comprising travelling "plates" heated by gaseous fuel, a thermostatic device adapted to be heated by the hot travelling plates, gaseous fuel heating burners, and a fuel supply regulating valve, an electric contactor device operated by the thermostat, an electromagnetic device connected with and adapted to operate the fuel supply valve, and an electric circuit in which which said electromagnetic device is placed, and opened and closed by the electric contactor device; whereby the temperature of the plates is maintained substantially uniform or to the degree required.

3. Machinery for making wafer biscuits and similar articles from batter, comprising travelling "plates" heated by gaseous fuel, a thermostatic device adapted to be heated by the hot travelling plates, gaseous fuel heating burners, a fuel supply regulating valve, an electric contactor device operated by the thermostat and adapted to serve as a temperature indicator and contactor adjusting means, and an electromagnetic device connected with and adapted to operate the fuel supply valve, and an electric circuit in which said electromagnetic device is placed, and opened and closed by the electrocontactor device.

4. Machinery for making wafer biscuits and similar articles from batter, comprising a plurality of interconnected plates adapted to travel through the machine in a continuous manner from end to end, a stationary heat receiving member in contact with which the plates move in their travel round the machine, a thermostatic device connected with same, and to which the heat of the receiving member is transferred, indicator device connected with the thermostatic device and operated thereby, an electric contactor device connected with the indicator device, gas heating burners for heating the plates, gas regulating valvular devices for controlling the supply of heating fluid to the burners, and electromagnetic devices connected with and adapted to operate the fuel valve, said electric devices being controlled by electric current, the supply of which is governed by the action of the indicator device.

5. Machinery for making wafer biscuits and similar articles from batter, comprising travelling "plates" heated by gaseous fuel, and provided with metal contact strips extending longitudinally on same and projecting beyond the ends of same, a thermostatic device adapted to be heated by contact with the strips on the travelling plates, gaseous fuel heating burners, a fuel supply regulating valve connected with same operated by the thermostatic device, an electric contactor device operated by the thermostat, an electromagnetic device connected with and adapted to operate the gaseous fuel valves, current to which is controlled by the contactor device, a rotatable indicator device adapted to operate and adjust the contactor device to be operated by the thermostatic device.

In testimony whereof I have signed my name to this specification.

JOSEPH HENRY BATES.